Sept. 18, 1956  A. H. DUBERSTEIN ET AL  2,763,765
VAPORIZERS
Filed Dec. 3, 1954

INVENTORS
ABNER H. DUBERSTEIN
GEORGE HETTINGER
BY
Herbert H. Thompson
ATTORNEY

United States Patent Office 2,763,765
Patented Sept. 18, 1956

2,763,765
VAPORIZERS

Abner H. Duberstein, Roslyn Heights, N. Y., and George Hettinger, Carlstadt, N. J., assignors to American Sundries Co., Brooklyn, N. Y., a copartnership Application December 3, 1954, Serial No. 472,882

5 Claims. (Cl. 219—40)

This invention relates to electrically heated steam vaporizers of the electrode type and adapted for use in sick rooms in order to relieve colds, croup and other respiratory ailments. It may also be used for increasing the humidity of rooms where excessive dryness is otherwise prevalent. Such vaporizers now on the market are of relatively small size so that while they heat up quickly, the water boils away in a comparatively short time so that they must be refilled every hour or so. On the other hand, if larger containers are used, there is usually a long delay in bringing the water to a boil since substantially the entire contents of the container must be heated to the boiling point before steam is obtained.

One object of the present invention is to produce steam within a matter of a few minutes in a large container by heating only a very limited amount of water immediately surrounding the electrodes by virtually insulating a limited space around the electrodes from the main water supply in the container, and preventing the hot water in this space and the steam condensate from intermingling with said main supply.

A further object of the invention is to avoid ejection from the container of droplets of hot water along with the steam.

A further object of the invention is to collect any such droplet or condensed steam and return it within the insulating sleeves surrounding the electrodes so that this hot water is not mixed with the water in the main supply in the container.

Referring to the drawings illustrating one form of our invention,

Figure 1:
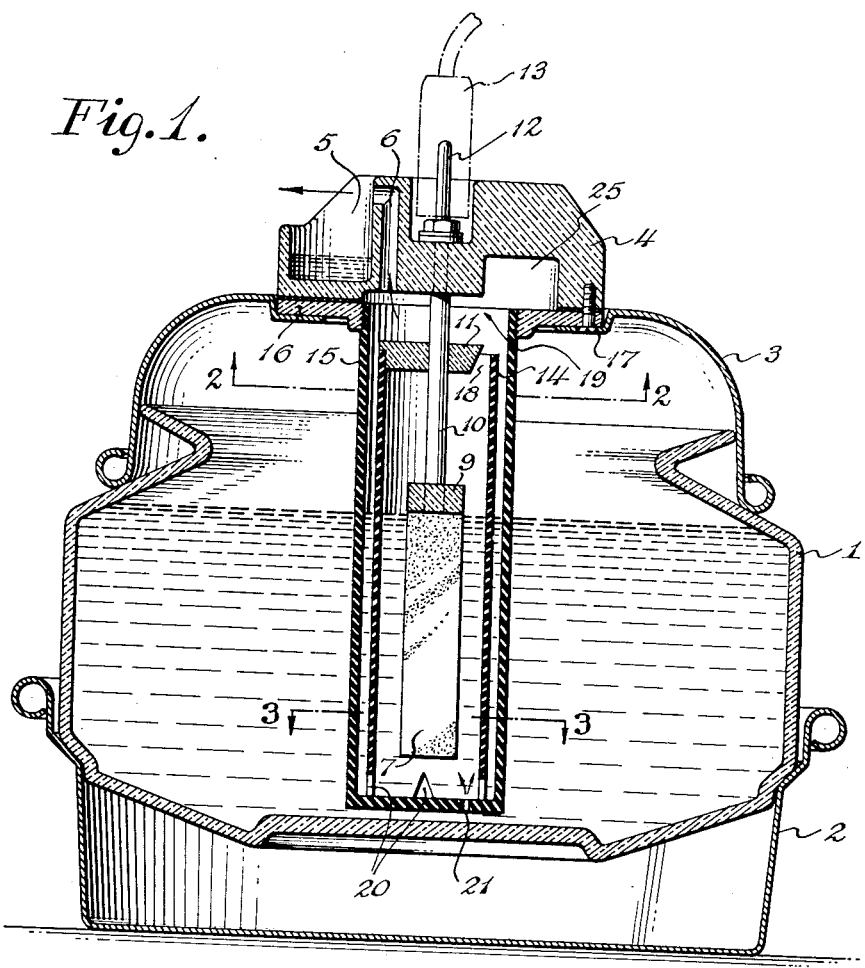
Fig. 1 is a vertical section through our improved vaporizer.
Figure 2:
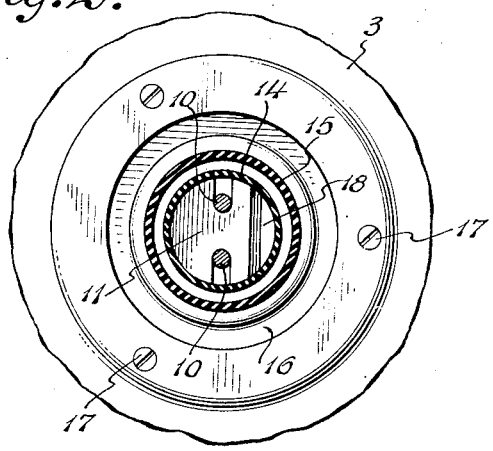
Fig. 2 is a horizontal section on line 2—2 of Fig. 1 through the insulating sleeves and electrodes looking upwardly in the direction of the arrows.

The main container for the water is shown in the form of a glass bowl 1 which may be supported at its bottom in a metal pan 2. The bowl is open at the top and in operation is closed by a metallic dished top 3 having a central opening in which is a porcelain base or cap 4 which supports all of the active elements of the vaporizer. Said base is shown as provided with a depression or cup 5 on one side adapted to contain the medicine to be vaporized. Adjacent the cup, the container is provided with a vertical and lateral bore 6 connecting the interior of the bowl 1 with the atmosphere to discharge the generated steam being blown into the room over the medicine to entrain the vapors therefrom.

Figure 3:
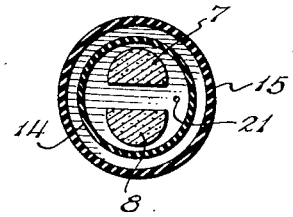
Fig. 3 is a horizontal section through the same on line 3—3 looking downwardly.

The two electrodes 7 and 8 may be formed of carbon rods shown as of semicircular cross-section, as shown in Fig. 3, with their flat surfaces facing one another. At the top the carbon rods are supported in spaced relation by insulating piece 9 through which the conducting rods 10 connected to electrodes 7 and 8 extend. Said rods pass upwardly through a porcelain closure and spacer 11, extending through apertures in the cap 4 and terminating in the usual conducting prongs 12 for engagement with the usual electrical plug or connector 13.

Surrounding said electrodes are two spaced concentric insulating sleeves 14 and 15 preferably formed of Bakelite or similar insulating and nonbreakable material. The outermost sleeve is securely threaded into or forcibly pressed into a central aperture in the bottom plate 16 which is detachably secured to the bottom of the porcelain top 4, the whole being secured in the top of cap 3 by means such as set screws 17. The inner sleeve 14 is uniformly spaced a small distance from the outer sleeve and is almost closed at the top by the aforesaid spacer 11 which acts as a closure for sleeve 14 and prevents most of the steam condensate from getting back within the inner tube where the drops would become entrained in the steam. Said closure is however, cut away at 18 to permit the steam to escape upwardly into the space 19 and into cavity 25 formed in the bottom of the base 4. It should be noted that said cutaway portion is spaced from and preferably on the opposite side of the bore 6 so that only comparatively dry steam will pass through the bore 6 and water droplets will fall back into the sleeves 15 and gradually descend through the space between the sleeves to the water level.

The bottom of the inner sleeve is provided with scallops 20 permitting an interchange of water within the inner sleeve and between the two sleeves so that the water stands at the same level in both. Preferably there is also provided in the otherwise closed base 21 of sleeve 15 at least one small opening so that as the water boils away within the sleeves, it will be replaced by water from the main container. It will be noted, however, that there is no circulation of hot water within the sleeves to the main supply in the container since the condensed steam and hot water drops fall into the space between the sleeves and not into the water in the main container.

By our invention, steam may be generated with tap water and without the addition of salt in a matter of a few minutes and even after several hours of operation the water in the outside container does not get more than lukewarm. Enough water may be replaced in the container to last all night. In fact, the container may be filled almost to the top without any danger of causing the steam jet to spit hot water droplets, since the condensed steam is returned to the space between the sleeves and is not entrained in the steam entering the jet pipe 6, so that only dry steam is emitted from the jet.

By our invention we also provide extra safety against electric shock in case the top is removed from the liquid container without disconnecting the electric plug 13 because of our double, spaced insulating sleeves completely enclosing the electrodes.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A heating unit for a liquid vaporizer comprising a pair of spaced electrodes adapted to be immersed in the liquid in the vaporizer, a pair of closely spaced insulating sleeves surrounding said electrodes and both extending above the normal water line, the outer sleeve having an opening adjacent the bottom thereof to admit liquid, the inner sleeve having openings adjacent the bottom thereof connecting with the interior outer sleeve, an insulating cap suspending said electrodes and sleeves from the bottom of the cap and providing a steam space above both sleeves, and an aperture through said cap for discharging steam therefrom.

2. A heating unit for a liquid vaporizer comprising a pair of spaced electrodes adapted to be immersed in the liquid in the vaporizer, a pair of closely spaced insulating sleeves surrounding said electrodes and both extending above the normal water line, the outer sleeve having a small opening adjacent the bottom thereof to admit liquid, the inner sleeve having openings adjacent the bottom thereof connecting with the interior outer sleeve, a closure on the top of the inner sleeve supporting the electrodes and having an opening therein at one side above the normal water line, and an insulating cap supporting said electrodes and sleeves and having a steam aperture located at a distance from said opening in said closure.

3. A heating unit for a liquid vaporizer comprising a pair of spaced electrodes adapted to be immersed in the liquid in the vaporizer, a pair of closely spaced insulating sleeves surrounding said electrodes and both extending above the normal water line, the outer sleeve having a small opening adjacent the bottom thereof to admit liquid, the inner sleeve having openings therein adjacent the bottom thereof connecting with the interior outer sleeve, an insulating base cap suspending said electrodes and sleeves from the bottom of the cap and providing a steam space above the sleeves, and means for preventing steam condensate from getting back within the inner tube.

4. A heating unit for liquid vaporizers as claimed in claim 3, in which said preventing means comprises a closure for the top of said inner tube with a steam discharge aperture therein, said electrodes being supported in spaced relation by said closure.

5. A heating unit for a liquid vaporizer comprising a pair of spaced electrodes adapted to be immersed in the liquid in the vaporizer, a pair of closely spaced insulating sleeves surrounding said electrodes and both extending above the normal water line, the outer sleeve having a small opening adjacent the bottom thereof to admit liquid, the inner sleeve having openings adjacent the bottom thereof connecting with the interior outer sleeve, and insulating means supporting said electrodes in spaced relation within said inner sleeve.

References Cited in the file of this patent
UNITED STATES PATENTS

| | | |
|---|---|---|
| 1,949,778 | Brown et al. | Mar. 6, 1934 |
| 2,533,794 | Hanks et al. | Dec. 12, 1950 |
| 2,713,628 | Barkin | July 19, 1955 |